Sept. 1, 1942.    J. F. SZOPIERAY    2,294,812
ENGINE
Filed April 19, 1940
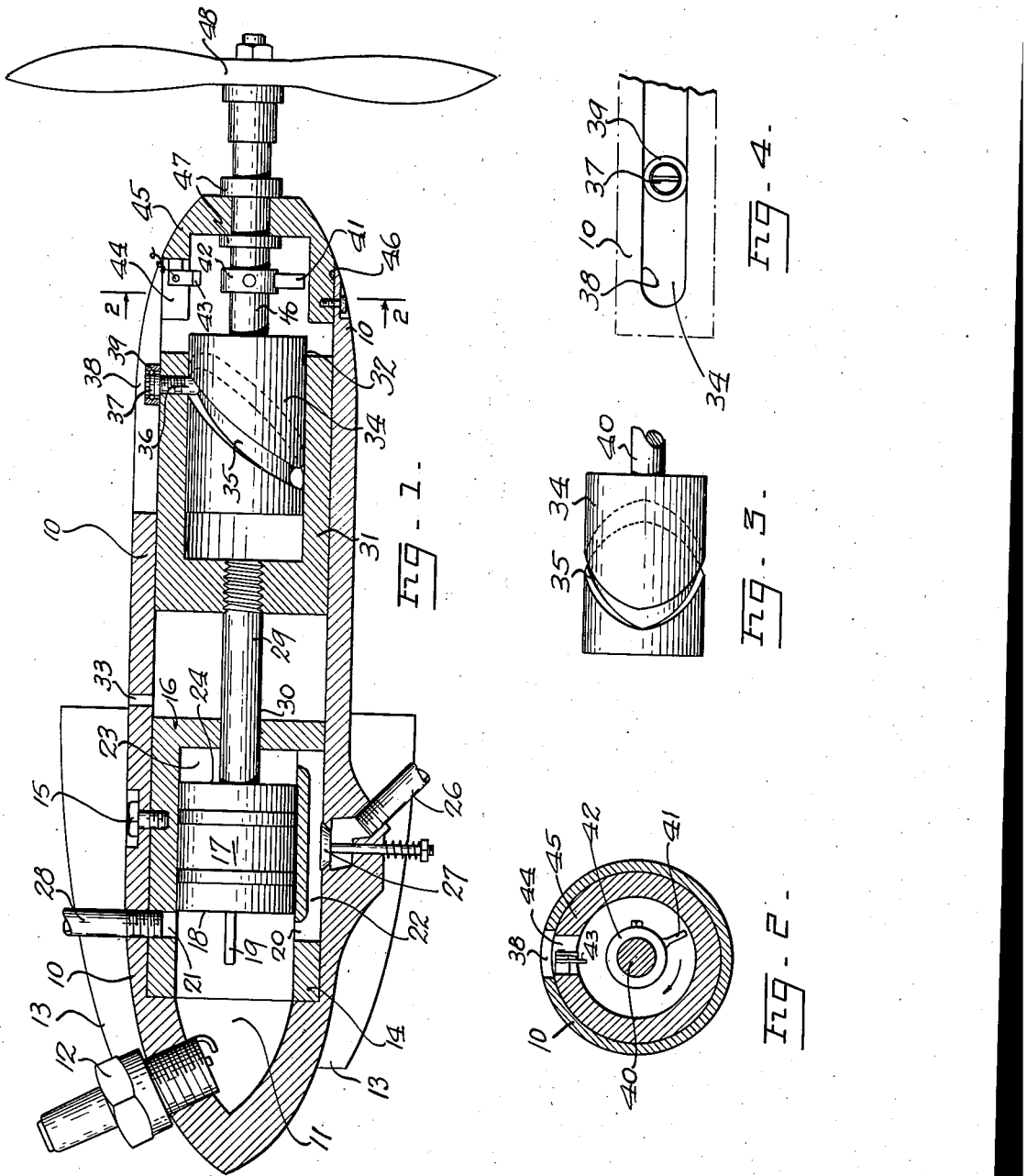
INVENTOR.
JOHN F. SZOPIERAY
BY George B. White
ATTORNEY.

Patented Sept. 1, 1942

2,294,812

UNITED STATES PATENT OFFICE 2,294,812

ENGINE

John F. Szopieray, Berkeley, Calif.

Application April 19, 1940, Serial No. 330,629

6 Claims. (Cl. 123—195)

This invention relates to engines.

An object of this invention is to provide an engine which is compact and light and which is adapted to be installed for efficient use in a limited space and where streamlining is of importance.

Another object of this invention is to provide an engine wherein the usual crank shaft is eliminated and the power is transmitted to a shaft substantially parallel with the axis of the piston of the engine.

Another object of this invention is to provide an engine, preferably a two cycle internal combustion engine, wherein the cylinder is so formed as to provide a more efficient precompression chamber at the back stroke of the piston.

Another object of this invention is to provide an engine wherein the piston, piston rod and the engine shaft are in substantially coaxial relation so as to form a compact elongated unit particularly fitting into vehicles having only limited space for power plant, such as for instance model airplanes, and the like, using small power engines of light weight to fit into the stream lined body of the airplane.

Another object of this invention is to provide an engine which is highly useful and simple in construction. Convenience of arrangement, lightness and comparative inexpense of manufacture are further objects which have been borne in mind in the production and development of the invention.

I am aware that some change may be made in the general arrangements and combinations of the several devices and parts, as well as in the details of the construction thereof without departing from the scope of the present invention as set forth in the following specification, and as defined in the following claims; hence I do not limit my invention to the exact arrangements and combinations of the said device and parts as described in the said specification, nor do I confine myself to the exact details of the construction of the said parts as illustrated in the accompanying drawing.

With the foregoing and other objects in view, which will be made manifest in the following detailed description, reference is had to the accompanying drawing for the illustrative embodiment of the invention, wherein:

Fig. 1 is a sectional view of my engine.

Fig. 2 is a cross sectional view of my engine, the section being taken on the lines 2—2 of Fig. 1.

Fig. 3 is a detail side view of the drive cam of my engine.

Fig. 4 is a fragmental top plan view of an end of the engine.

In carrying out my invention in the herein illustrative embodiment I make use of an elongated casing 10 which is preferably integrally closed at one end so as to form a combustion chamber 11 at said closed end. In this closed end is secured a usual sparkplug 12 for the ignition of the mixture in said combustion chamber 11. The combustion end of the casing 10 is suitably cooled for instance by providing cooling fins 13 near said end.

Into the combustion end portion of the casing 10 is pressed or otherwise fixedly secured a cylinder 14. A suitable set screw 15 provides further anchoring for the cylinder 14 against turning. The cylinder 14 is cup shaped and is so inserted in the combustion end of the casing 10 that its bottom provides a partition wall 16 separating the cylinder space from the remaining space in the casing 10. In other words the cylinder space in the combustion end of the casing 10 is separated from the remaining space of the casing 10 by a partition wall 16 which extends transversely across the interior of the casing 10.

A piston 17 works in the cylinder 14. In this illustration the invention is shown in connection with a two cycle engine. The face 18 of the piston 17 facing toward the combustion chamber 11 has a deflector or baffle 19 projected therefrom between the intake port 20 and exhaust port 21 which ports are located substantially on opposite sides of the cylinder 14. The intake port 20 receives the combustible mixture through a by-pass 22 from a precompression chamber 23 which latter is formed between the partition wall 16 of the cylinder 14 and the adjacent or trailing face 24 of the piston 17. The mixture is first fed to the by-pass 22 through a feed line 26 and a check valve 27. The feed line 26 is connected to a suitable mixer or carburetor, not shown. During the compression stroke of the piston 17 the suction created in the wake of the piston in the precompression chamber 23 opens the normally resiliently closed check valve 27 and draws the combustible mixture into the precompression chamber 23. During this stroke the piston 17 covers the intake port 20. During the power stroke of the piston 17 the mixture in the precompression chamber 23 and in the by-pass 22 is compressed and holds the check valve 27 in closed position. As soon as the piston 17 clears the intake port 20 the precompressed mixture is forced through the by-pass 22 into the combustion chamber 11 and partially scavenges the exhaust gases before the exhaust port 21 is again covered by the piston 17. An exhaust pipe 28 carries away the exhaust gases from the exhaust port 21.

The precompression of the combustible mixture in this engine is greatly improved by reason of the elimination of the crank case. The precompression chamber 23 is limited to a definite area. This is accomplished by the use of a straight reciprocating piston rod 29 which extends from the piston 17 through a suitably packed opening 30 in the partition wall 16.

For converting the reciprocating movement of the piston rod 29 into rotary motion I provide a rectilinearly moving member guided within the casing 10 but outside of the cylinder 14. In this illustration a hollow sleeve 31 is reciprocating in the casing 10 and it is secured to the end of the piston rod 29. It is to be noted that in this illustration the hollow sleeve 31 is also substantially cup shaped. The piston rod 29 is connected to the bottom of the sleeve 31, and the open end 32 of the sleeve 31 faces away from the cylinder 14.

An air vent 33 through the wall of the casing 10 is located between the partition wall 16 and the sleeve 31 so as to reduce air resistance to the reciprocating of the sleeve 31. The interior of the sleeve 31 is cylindrical and a cam drum 34 is rotatable therein. This drum 34 has on it an endless spiral groove 36 extending all around it. One half of the groove 34 has its pitch in one direction and the other half has its pitch in the opposite direction. A stud 36 is extended from the sleeve 31 into the groove 35. The stud 36 is moved by the rectilinearly moving sleeve 31 and works in the groove 35 so as to convert the reciprocating motion of the sleeve 31 into rotary motion of the cam drum 34. This arrangement also determines the stroke of the sleeve 31. The sleeve 31 is held against rotation, in this illustration, by the head of the stud 36. The stud 36 herein is threadedly secured into the wall of the sleeve 31 and its head 37 extends into a longitudinal slot 38 in the wall of the casing 10. The head 37 is surrounded by a ball bearing 39 to reduce frictional resistance to the reciprocation of the sleeve 31.

A shaft 40 extends from the cam drum 34 and is rotated thereby. In this illustration the shaft 40 controls the ignition by means of an abutment finger 41 adjustably fixed by means of a collar 42 on the shaft 40. A normally open resilient circuit breaker contact 43 is moved momentarily into circuit closing position every time the abutment finger 41 strikes it as said finger 41 is carried around by the shaft 40. The circuit breaker is suitably connected to the ignition circuit so as to create a spark every time the contact 43 is struck by the finger 41.

The circuit breaker contact 43 is mounted in a recess 44 in a closure cap 45 which latter is so fixed into the open end 46 of the casing 10 that it is removable at will for endwise assembly of the parts of the engine within the casing 10. The shaft 40 is journalled in the cap 45 and is held against endwise displacement by spaced collars 47. The outer collar 47 is removable. On the end of the shaft 40 is suitably mounted a propeller 48.

The entire unit is assembled coaxially and it is mounted in place in any suitable manner, not shown. In operation the fuel is suitably mixed and the mixture is fed to the engine in the usual manner. The mixture introduced into the by-pass 22 is first precompressed by the power stroke of the piston 17 against the partition wall 16. The precompressed mixture is then by-passed at the intake stroke into the combustion chamber 11 where it is ignited and acts on the piston 17 for the next power stroke. The internal combustion engine herein shown operates on the two-cycle principle, but its precompressing action is more positive and efficient than that of engines heretofore used which precompressed in the crankcase. The rectilinear movement of the piston rod 29 allows the use of a shaft 40 substantially parallel with the axis of reciprocation of the piston 17. The sleeve and drum transmission between the piston rod 29 and the shaft 40 allows a coaxial relation between the shaft 40 and the engine. The engine is simple, it is assembled around one longitudinal axis, it is compact and it is adapted for use in limited space and in streamlined bodies. The engine operates efficiently and it is particularly suitable for use where small power units are required, such as in model crafts, model or small boats, airplanes and the like.

What I claim is:

1. In an engine, unitary elongated casing having a longitudinal axial chamber therein, a partition wall transversely dividing said chamber, a piston working longitudinally in the chamber at one side of the partition, a reciprocating element working in the chamber at the other side of the partition, means extended through the partition to transmit reciprocating motion from the piston to the reciprocating element, a drive shaft journaled in the casing and being held against axial movement in the adjacent end of the casing, and means in the casing connecting said reciprocating element and the shaft so as to convert the reciprocating motion of said element into rotating motion of the shaft.

2. In an engine of the character described, an elongated casing having a longitudinal chamber therein, one end of the chamber being formed into a combustion chamber, a cylinder inserted into said combustion chamber, means to hold said cylinder in position in said chamber, a transverse wall at the portion of the cylinder farthest from said combustion end, a reciprocating sleeve in the casing between the transverse wall and the other end of the chamber, a piston working in the cylinder, a connecting rod extended from said piston through the transverse wall and being connected to said sleeve to move the sleeve with the piston, means in the sleeve to convert the reciprocation of the sleeve into rotary motion, a drive shaft extended from said converting means through the second end of the chamber, and means to journal and hold said drive shaft against axial movement.

3. In an engine of the character described, unitary elongated casing having a longitudinal chamber therein, a combustion head formed on one end of the chamber, a removable closure on the other end of the chamber, a cylinder insertable through the second end of the chamber so as to be located adjacent said combustion end, a sleeve insertable between said open end and the cylinder, a partition wall between the cylinder and the sleeve being stationary with said cylinder, means to hold said cylinder in position, a shaft journaled and held longitudinally in said chamber and in said closure, a piston working in the cylinder longitudinally of the chamber, a connecting rod slidable through said partition wall being connected at one end thereof to the piston and at its other end to the sleeve for moving said sleeve and piston together, and connecting means between the shaft and the sleeve to convert the reciprocation of the sleeve into rotation of the shaft.

4. In an engine of the character described, a casing having a combustion chamber therein, a cylinder insert removably secured into said chamber so as to accommodate the piston of the engine working therein, said insert being open at its end adjacent the combustion chamber, a wall at the other end of the insert, a connecting rod of the piston being slidably extended through said wall, said casing and insert having suitably registering intake and exhaust passages for introducing the mixture between the piston and said wall for precompressing and then by-passing the precompressed mixture into said combustion chamber.

5. In an engine construction, a unitary elongated casing having a continuous axial chamber open at one end, an element for separating a combustion chamber at the closed end of the chamber being insertable through said open end, a piston working in said combustion chamber, means detachably secured to the open end of said axial chamber to journal a rotating shaft axially with respect to said axial chamber, and means insertable into the axial chamber through said open end for converting the reciprocating motion of the piston into rotary motion of the shaft.

6. In an engine construction an elongated casing having a chamber therein, a cylinder insert in the chamber to form a cylinder for the piston of the engine, said casing and said insert having registering passages for fuel intake and exhaust, and means to align and removably hold said insert in said chamber.

JOHN F. SZOPIERAY.